June 28, 1966  E. F. MALINOWSKI  3,258,289
VEHICLE SEAT
Filed Oct. 7, 1963
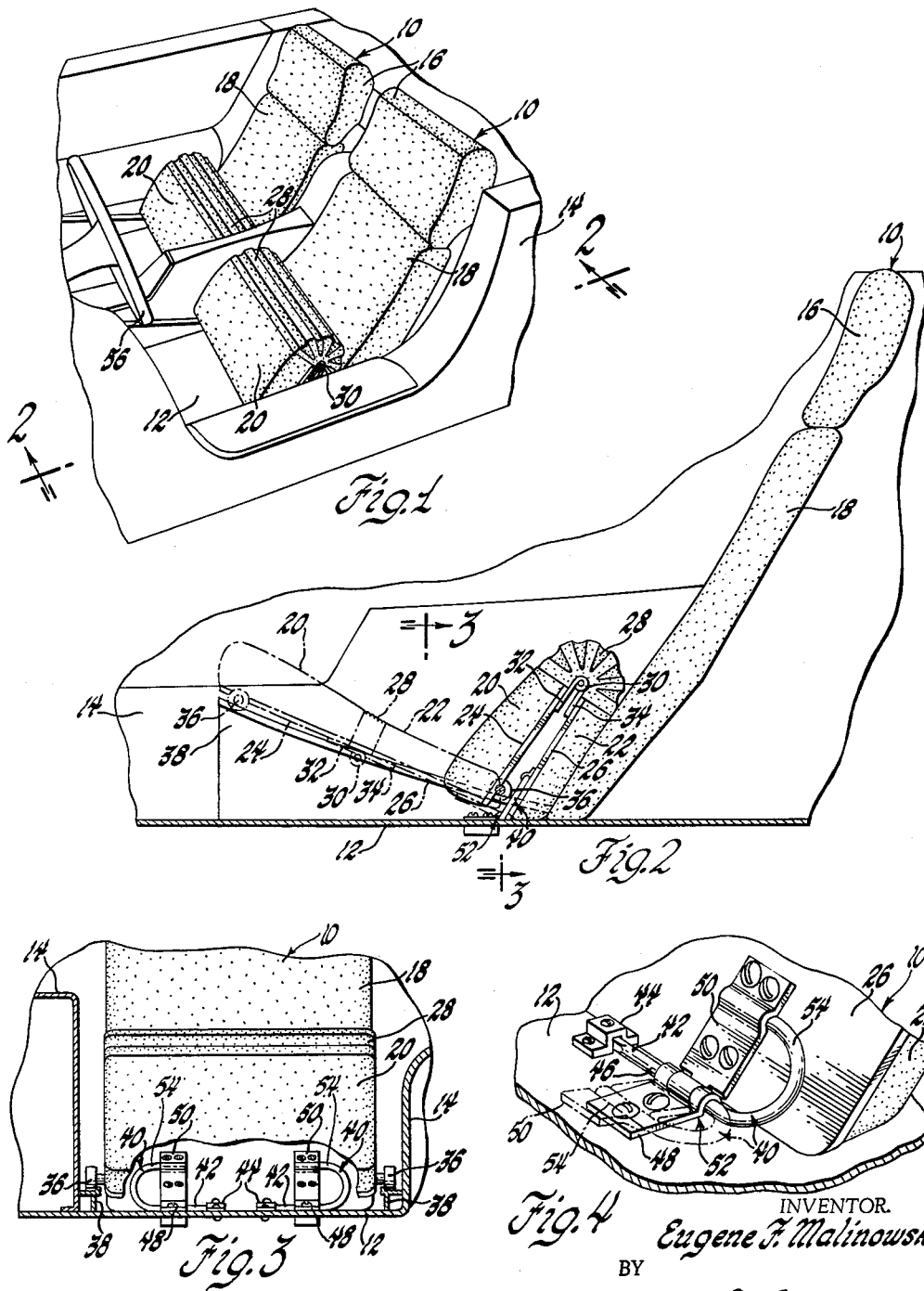
INVENTOR.
Eugene F. Malinowski
BY
R. L. Spencer
ATTORNEY United States Patent Office 3,258,289
Patented June 28, 1966

3,258,289
VEHICLE SEAT
Eugene F. Malinowski, Oak Park, Mich., assignor to General Motors Corporation, Detroit, Mich., a corporation of Delaware
Filed Oct. 7, 1963, Ser. No. 314,156
3 Claims. (Cl. 296—65)

This invention relates to a vehicle seat and more particularly to a folding easy entrance automobile seat.

The increased usage of the modern sports car or compact vehicle has increased the demand for seating arrangements which permit easier entrance and exit from such vehicle because of the limited leg room therein.

It is an object of this invention to provide a folding easy entrance seat for use in a sports car or a compact vehicle which provides more room for entrance and exit from the vehicle.

Another object of this invention is to provide a divided seat cushion for a vehicle wherein the seat assembly is movable between a seat forming position and an easy entrance position.

A further object of this invention is to provide a supporting track for a divided seat cushion for use in a vehicle wherein the track will support the seat cushion in the seat forming position and in the easy entrance position and during movement therebetween.

Another object of this invention is to provide an assist means for biasing a divided seat from a seat forming position to an easy entrance position for ease in utilizing the seat during entrance and exit from the vehicle.

An additional object of this invention is to provide in a divided foldable seat assembly for a vehicle, a simple inexpensive biasing means for biasing the seat assembly toward a folded easy entrance position comprising a torque rod having a portion thereof fixed against rotation and retained in position on the vehicle body by means of a hinge used to support a portion of the seat for pivotal movement with respect to the body.

A further object of this invention is to provide a resilient bellows type connection between two movable cushions of a seat unit for expanding between the adjacent ends as the cushions are moved to a folded easy entrance position and for compressing between the adjacent ends as the cushions are moved to an extended seat forming position.

These and other objects of this invetnion will become more apparent as reference is had to the accompanying specification and drawings wherein:

FIGURE 1 is a perspective view of a vehicle body, with sections cut away, showing a divided vehicle seat in the easy entrance position utilizing the present invention.

FIGURE 2 is a view taken substantially along the line 2—2 of FIGURE 1 showing a side view of the vehicle seat with the divided seat cushion shown in the easy entrance position and, in phantom lines, in the seat forming position.

FIGURE 3 is a view taken substantially along the line 3—3 of FIGURE 2 showing the location and manner in which the assist torque rods and hinges are secured to the seat bottom and the floor.

FIGURE 4 is an elongated perspective view of the seat cushion in the easy entrance position, with sections broken away, showing the manner in which the torque rod is secured to the vehicle floor and acts as a pintle for the seat hinge.

Referring to the drawings, as best seen in FIGURE 1, a pair of vehicle seat assemblies 10 are supported on the floor 12 of a compact vehicle body 14. Since the seat assemblies are identical, only the driver's seat will be described in detail and similar parts will have the same identification numerals.

As best seen in FIGURE 2, the seat assembly 10 has a head rest 16 and a seat back unit or cushion 18 forming the back support and a divided seat unit or cushion consisting of a front cushion portion 20 and a rear cushion portion 22, forming the seat support. The cushion portions 20, 22 are movable between an easy entrance position, as shown in solid lines in FIGURE 2, and a seat forming position, as shown in phantom lines of FIGURE 2. The seat cushion portions 20 and 22 are secured to and supported on seat support members 24 and 26, respectively. The adjacent edges of seat cushions 20 and 22 are bridged by a resilient bellows type section 28 which expands as the seat cushion moves to the easy entrance position, as shown in FIGURE 2, and is compacted, as shown in phantom lines of FIGURE 2, when the seat unit is in the seat forming position. The adjacent edges of cushion portions 20 and 22 are effectively joined by a hinge 30 which has one strap 32 secured to the support member 24 and the other strap 34 secured to the support member 26. The hinge 30 controls movement of the cushion portions 20 and 22 relative to each other.

As best seen in FIGURE 3, a pair of rollers 36 are secured to the support member 24 at each side of the front edge of the front cushion 20. The rollers 36 are supported for movement on a track member 38 secured to the vehicle body. The track members 38 guide the rollers for movement between the easy entrance position and the seat forming position and support the front end of the seat during these movements and while in the positions.

As seen in FIGURES 3 and 4, a pair of torque rods 40 have one of their ends 42 secured to the vehicle floor 12 by a clamp 44 which holds that end of the torque rod from any movement. The straight sections 46 of the torque rods 40 serve as pintles for hinges 52. The hinges 52 have pairs of hinge straps 48, 50 which are secured to the floor 12 and support member 26, respectively. The other ends 54 of the torque rods 40 are held against the support member 26 by the hinge straps 50 for movement therewith. The hinges 52 pivotally secured and support the rear of the seat cushion 22 on the vehicle floor for movement between the easy entrance position and the seat forming position.

The torque rods 40 are secured to the vehicle floor 12 by the bracket 44 in such a position that as the seat cushions 20 and 22 are moved from the easy entrance position forwardly to the seat forming position, the torque rod 40 is resiliently deformed to the position shown in phantom lines of FIGURE 4 and when stressed by movement to such a position biases the seat toward its easy entrance position.

The use of torque rods as a biasing means and pintles for the rear hinges reduces the number of parts required and thus reduces the cost of the assembly.

In operation, the occupant steps into the vehicle body 14 and rests his weight on the bellows portion 28 while exerting force against the seat back 18. The combined forces of the weight and the counter force of the pressure against the seat back will be translated into a forward and downward force which will cause the rollers 36 to move forwardly on track 38 thereby moving the cushions 20 and 22 from easy entrance position to seat forming position. As the seat moves forwardly to the seat forming position, the occupant may extend his legs forwardly beneath the steering wheel 56. By the forward movement of the seat cushions 20 and 22, the torque rods 40 are resiliently deformed by having the ends 54 move rotatively about their secured ends 42. The energy stored in the torque rods biases the seat toward the easy entrance position such that as the occupant leaves the vehicle by placing his hands on adjacent portions of the vehicle body and lifting a portion of his weight thereby, the stored energy in the torque rods will assist in raising his weight and moving the seat rearwardly to the easy entrance position. With the seat in the easy entrance position, the occupant has adequate space between the steering wheel 56 and the front seat cushion 26 to exit from the vehicle.

Thus, it can be seen that this invention provides a simple and inexpensive vehicle seat assembly with a divided seat cushion that can be easily moved between the seat forming position and easy entrance position by a person using the seat.

The invention is not intended to be limited to the details of construction of the illustrated embodiment which may be changed or modified within the scope of the appended claims.

I claim:

1. A combination comprising, a seat assembly having a fixed seat back unit and a foldable seat unit, said seat assembly being adapted to be mounted on a supporting floor, said seat unit having a seat forming position and an easy entrance position and being movable therebetween, said seat unit including a first cushioned member, a second cushioned member having one edge hingedly secured to one edge of said first cushioned member for controlling relative movement of said members, said second cushioned member being rotatably secured to the supporting floor for movement between said positions, track means secured on the supporting floor for supporting said first cushioned member and for guiding said first cushioned member between said positions, and roller means connected to said first cushioned member for supporting and guiding said first cushioned member on said track means.

2. In combination, a seat assembly having a fixed seat back unit and a foldable seat unit, said seat assembly being adapted to be mounted on a supporting floor, said seat unit having a seat forming position and an easy entrance position and being movable therebetween, said seat unit including a first cushioned member, a second cushioned member having one edge hingedly secured to one edge of said first cushioned member for controlling relative movement of said members, said second cushioned member being rotatably secured to the supporting floor for movement between said positions, track means secured on the supporting floor for supporting a free edge of said first cushioned member and for guiding said first cushioned member between said positions, roller means connected to the said first cushioned member adjacent the free edge thereof for supporting and guiding said first cushioned member on said track means, and biasing means urging said seat unit to said easy entrance position.

3. In combination, a vehicle body, a seat assembly mounted in said body, said seat assembly having a head rest, a seat back unit, a seat unit and support means for mounting said seat assembly in said body, said seat unit having a seat forming position and an easy entrance position and being movable therebetween, said seat unit including a front seat cushion, a rear seat cushion, a flexible bellows secured to adjacent edges of said cushions, a first hinge means having one strap connected to said front cushion and the other strap connected to said rear cushion at the adjacent edges for controlling movement of one of said cushions relative to the other of said cushions during movement of said seat unit, roller means attached to said front cushion for supporting and guiding said front cushion on said support means, a second hinge means having one strap secured to said body and the other strap secured to said rear cushion for pivotally supporting said rear cushion for movement between said positions, and a torque rod having one end secured to said body adjacent said second hinge means and the other end bearing against said rear cushion for biasing said seat unit to said easy entrance position, said torque rod also acting as the pintle for said second hinge means.

References Cited by the Examiner
UNITED STATES PATENTS

| | | | |
|---|---|---|---|
| 487,876 | 12/1892 | Jenson | 297—334 |
| 2,078,961 | 5/1937 | Meltzer | 297—331 |
| 2,164,116 | 6/1939 | Lincoln | 297—332 |
| 2,649,595 | 8/1953 | Lewin | 5—91 |
| 3,058,126 | 10/1962 | Fleming | 5—352 |

BENJAMIN HERSH, *Primary Examiner.*

P. GOODMAN, *Assistant Examiner.*